_United States Patent Office_

3,647,785
Patented Mar. 7, 1972

1

3,647,785
NOVEL 3-INDOLYLALIPHATIC ACID ANHYDRIDES
Seitetsu Arasaki, Minoo-shi, and Hisao Yamamoto and Shigeho Inaba, Nishinomiya-shi, Japan, assignors to Sumitomo Chemical Company, Ltd., Osaka, Japan
No Drawing. Filed Apr. 15, 1968, Ser. No. 721,200
Claims priority, application Japan, Apr. 25, 1967, 42/26,772; May 12, 1967, 42/30,289
Int. Cl. C07d 27/32
U.S. Cl. 260—240 J                                    3 Claims

ABSTRACT OF THE DISCLOSURE

Novel 3-indolylaliphatic acid anhydrides having prominent anti-inflammatory activity are prepared by dehydrating 3-indolylaliphatic acid derivatives with a dehydrating agent such as dicyclohexylcarbodiimide in the absence or presence of an inert solvent.

---

This invention relates to novel 3-indolylaliphatic acid anhydrides and a process for preparing the same. More particularly, the invention pertains to novel 3-indolylaliphatic acid anhydrides represented by the formula,

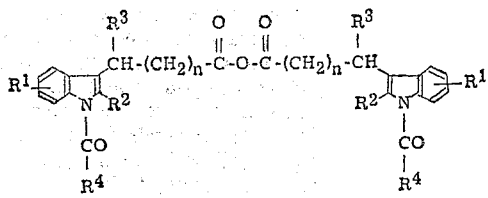

wherein $R^1$ is selected from the group consisting of a hydrogen atom, a lower alkyl group having up to 3 carbon atoms, a lower alkoxy group having up to 3 carbon atoms, a lower alkylthio group having up to 3 carbon atoms and a halogen atom, $R^2$ and $R^3$ are each selected from the group consisting of a hydrogen atom and a lower alkyl group having up to 3 carbon atoms, $R^4$ is selected from the group consisting of a styryl group and a pyridyl group, and $n$ is an integer of 0, 1 or 2, and a process for preparing the same.

The present inventors have found that the said 3-indolylaliphatic acid anhydrides represented by the Formula I possess prominent anti-inflammatory effects in animal tests.

One object of the present invention is to provide novel 3-indolylaliphatic acid anhydrides and a process for preparing the same. Another object of the present invention is to provide a pharmaceutical composition containing novel 3-indolylaliphatic acid anhydride. Other objects of the present invention will be apparent from the following description.

In order to accomplish these objects, the present invention provides 3-indolylaliphatic acid anhydrides represented by the above-mentioned Formula I.

Further the present invention provides a process for preparing 3-indolylaliphatic acid anhydrides represented by the above-mentioned Formula I, which comprises reacting a 3-indolylaliphatic acid derivative represented by the formula,

2

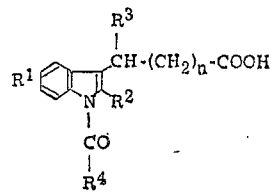

wherein $R^1$, $R^2$, $R^3$, $R^4$ and $n$ have the same meanings as defined above, with a dehydrating agent to yield the 3-indolylaliphatic acid anhydride.

Furthermore the present invention provides a pharmaceutical composition containing, as an essential ingredient, an effective dose of 3-indolylaliphatic acid anhydride represented by the Formula I and a pharmaceutically acceptable carrier.

All of 3-indolylaliphatic acid anhydrides prepared according to the present invention are novel compounds.

In practicing the present invention, a 3-indolylaliphatic acid derivative represented by the Formula II is reacted with a suitable dehydrating agent, e.g. any of ketenes, acetic anhydride and carbodiimides, in the absence or presence of a solvent such as, tetrahydrofuran, methylene dichloride or acetonitrile, whereby the novel 3-indolylaliphatic acid anhydrides represented by the Formula I are prepared. In using ketene as a dehydrating agent, the usual procedure for conducting a reaction is to pass gaseous ketene into a liquid reactant or a solution. For example, 1 mole of a 3-indolylaliphatic acid derivative is placed in a gas-washing bottle in ice and 0.5–0.55 mole of gaseous ketene generated from acetone is passed in. The resulting mixture is fractionated slowly to give the aimed anhydride.

Examples of the carbodiimides employed as the dehydrating agent include dicycloalkylcarbodiimides, e.g. dicyclohexylcarbodiimide and the like, dialkylcarbodiimides, e.g. dimethylcarbodiimide, dihexylcarbodiimide and the like, and diarylcarbodiimides, e.g. diphenylcarbodiimide, ditolylcarbodiimide. Among these, dicyclohexylcarbodiimide gives the most favorable results in almost all cases.

Generally speaking, the reaction proceeds under a mild condition. According to relatively simple after-treatments of the reaction the aimed products are obtained in high yields.

These anhydrides are relatively stable, but in water or in moisture, they are gradually hydrolized to give the original indolylaliphatic acid derivatives.

According to the present process, compounds having such substituents as shown below are readily obtained.

$R^1$: methyl, ethyl, methoxy, ethoxy, hydrogen, chlorine, bromine, fluorine, methylthio and ethylthio
$R^2$: hydrogen, methyl and ethyl
$R^3$: hydrogen, methyl and ethyl
—CO—$R^4$: cinnamoyl, nicotinoyl and isonicotinoyl Examples of the present compounds are as follows:

1-cinnamoyl-2-methyl-5-methoxy-3-indolylacetic anhydride
γ-(1-cinnamoyl-2-methyl-5-methoxy-3-indolyl) butyric anhydride
1-cinnamoyl-2-ethyl-5-methoxy-3-indolylacetic anhydride 1-cinnamoyl-5-methoxy-3-indolylacetic anhydride
1-cinnamoyl-2-methyl-5-chloro-3-indolylacetic anhydride
1-(α-methyl-cinnamoyl)-2-methyl-5-methoxy-3-indolylacetic anhydride
1-cinnamoyl-2-methyl-3-indolylacetic anhydride
1-cinnamoyl-2-methyl-5-ethoxy-3-indolylacetic anhydride
α-(1-cinnamoyl-2-methyl-5-methoxy-3-indolyl) propionic anhydride
α-(1-cinnamoyl-2-methyl-5-methoxy-3-indolyl) butyric anhydride
β-(1-cinnamoyl-2-methyl-5-methoxy-3-indolyl) propionic anhydride
1-cinnamoyl-2-methyl-5-methylthio-3-indolylacetic anhydride
1-nicotinoyl-2-methyl-5-methoxy-3-indolylacetic anhydride

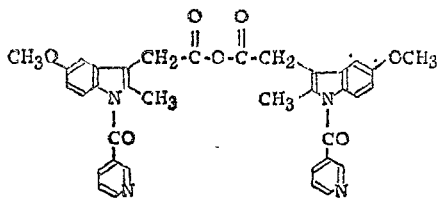

β{1-nicotinoyl-2-methyl-5-methoxy-3-indolyl} propionic anhydride
1-isonicotinoyl-2-methyl-5-methoxy-3-indolylacetic anhydride
1-nicotinoyl-3-indolylacetic anhydride
1-nicotinoyl-2-methyl-5-chloro-3-indolylacetic anhydride
1-nicotinoyl-2,5-dimethyl-3-indolylacetic anhydride
1-nicotinoyl-2,4-dimethyl-3-indolylacetic anhydride
1-nicotinoyl-2,6-dimethyl-3-indolylacetic anhydride
α-(1-nicotinoyl-2-methyl-5-methoxy-3-indolyl) propionic anhydride
γ-(1-nicotinoyl-2-methyl-5-methoxy-3-indolyl) butyric anhydride The compounds of this invention are markedly low in toxicity, and even when over 2,000 mg./kg. of these compounds are orally administered to each of rat and mouse, they scarcely show toxic symptoms and occult bleeding is negative in faces thereof. Nevertheless, the activities of these compounds are much higher than those of 1,2-diphenyl-3,5-dioxo-4-n-butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of these compounds of the present invention, and 1,2-diphenyl-3,5-dioxo-4-n-butylpyrazolidine (phenylbutazone) are given in the following table.

TABLE

| Compound | 50% inhibiting dose of carrageenin edema of rat's hind paw, per os (mg./kg.) | 50% lethal dose of rat, per os (mg./kg.) | Therapeutic ratio [1] |
|---|---|---|---|
| 1,2-diphenyl-3,5-dioxo-4-n-butylpyrazoidine [2] | 320 | ca 600 | ca 1.9 |
| 1-cinnamoyl-2-methyl-5-methoxy-3-indolylacetic anhydride [3] | 20 | >1,500 | >75.0 |
| 1-nicotinoyl-2-methyl-5-methoxy-3-indolylacetic anhydride [3] | 120 | >2,000 | >16.7 |
| α{1-cinnamoyl-2-methyl-5-methoxy-3-indolyl}propionic anhydride [3] | 35 | >1,500 | >43.8 |

[1] 50% lethal dose/50% inhibiting dose of carrageenin edema.
[2] Phenylbutazone.
[3] Present compound.

The present inventors have found that some other anhydrides of the present invention are superior to 1,2-diphenyl-3,5-dioxo-4-n-butylpyrazolidine (phenylbutazone) in the therapeutic ratios thereof and have great practical values.

It has found that these compounds also have comparatively potent analgestic activities shown by Haffner's method, and anti-pyretic activities in pyrogen test.

The following examples illustrate the present invention in further detail, but these are merely illustrative and it is needless to say that the invention is not limited thereto.

EXAMPLE 1

To a solution of 6.5 g. of 1-nicotinoyl-2-methyl-5-methoxy-3-indolylacetic acid in 180 ml. of anhydrous tetrahydrofuran was added 2.2 g. of dicyclohexylcarbodiimide, and the mixture was allowed to stand at room temperature for 2 days. White needles of urea compound were removed by filtration, and the filtrate was distilled under reduced pressure to a yellow crystalline residue. The residue was dissolved in benzene, and the solution was poured into petroleum-benzene and was then allowed to stand in a cold place to give yellow crystals of 1-nicotinoyl-2-methyl-5-methoxy-3-indolylacetic anhydride.

*Elementary analysis.*—Calcd. for $C_{36}H_{30}O_7N_4$ (percent): N, 8.89. Found (percent): N, 8.64.

Infrared absorption spectrum $$\nu_{max.}^{cm.^{-1}}\ 1820,\ 1750,\ 1680$$

A suspension of anhydride in water was heated, whereby the anhydride was hydrolyzed to 1-nicotinoyl-2-methyl-5-methoxy-indolylacetic acid.

EXAMPLE 2

To a solution of 7.0 g. of 1-cinnamoyl-2-methyl-5-methoxy-3-indolylacetic acid in 150 ml. of tetrahydrofuran was added 2.2 g. of dicyclohexylcarbodiimide, and the mixture was allowed to stand overnight at room temperature. White needles of urea compound were removed by filtration, and the filtrate was distilled under reduced pressure to a residue, which was poured into ether to give pale yellow crystals. The crystals were collected by filtration. Recrystallization from tetrahydrofuran-petroleum ether gave 6.0 g. of a pale yellow 1-cinnamoyl-2-methyl-5-methoxy-3-indolylacetic anhydride, M.P. 153°–154° C. (decomposition).

Infrared absorption spectrum $$\nu_{max.}^{cm.^{-1}}\ 1820,\ 1750,\ 1680,\ 1630,\ 1580$$

EXAMPLE 3

To a solution of 7.2 of β-(1-cinnamoyl-2-methyl-5-methoxy-3-indolyl)propionic acid in 150 ml. of tetrahydrofuran was added 4.0 g. of dicyclohexylcarbodiimide, and the mixture was allowed to stand overnight at room temperature. White needles of urea compound were removed by filtration, and the filtrate was distilled under reduced pressure to a yellow crystalline residue. The residue was dissolved in benzene, and the solution was poured into petroleum-benzene and was then allowed to stand in a cold place to give yellow crystals of β-(1-cinnamoyl-2 - methyl-5-methoxyindolyl)propionic anhydride, which upon crystallization from a mixture of tetrahydrofuran and n-hexane showed M.P. 129°–131° C.

*Elementary analysis.*—Calcd. for $C_{44}H_{40}O_7N_2$ (percent): N, 3.95. Found (percent): N, 3.92.

Infrared absorption spectrum $$\nu_{max.}^{cm.^{-1}}\ 1820,\ 1750,\ 1680,\ 1620,\ 1580\ cm.^{-1}$$

Heating a suspension of the anhydride in water caused hydrolysis to give β-(1-cinnamoyl-2-methyl-5-methoxy-indolyl)propionic acid.

What we claim is:

1. A 3-indolylaliphatic acid anhydride represented by the formula

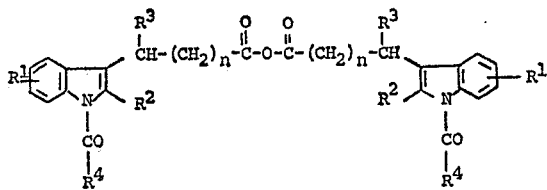

wherein $R^1$ is selected from the group consisting of a hydrogen atom, a lower alkyl group having up to 3 carbon atoms, a lower alkoxy group having up to 3 carbon atoms, a lower alkylthio group having up to 3 carbon atoms and a halogen atom, $R^2$ and $R^3$ are each selected from the group consisting of a hydrogen atom and a lower alkyl group having up to 3 carbon atoms, $R^4$ is a styryl group, and $n$ is an integer of 0, 1 or 2.

2. 1-cinnamoyl-2-methyl-5-methoxy-3-indolylacetic anhydride.

3. β-(1-cinnamoyl-2-methyl-5-methoxy-3-indolyl) proprionic acid anhydride.

References Cited

UNITED STATES PATENTS

| 3,242,185 | 3/1966 | Shen | 260—294.8 |
| 3,271,394 | 9/1966 | Shen | 260—247.2 |

FOREIGN PATENTS

| 698,378 | 10/1967 | Belgium | 260—240 J |

OTHER REFERENCES

Derwent Belgian Patents Report, vol. 46/67, Gp. 3, page 5 (Dec. 13, 1967) (abstracts of Belgian Patents 698,378 issued May 11, 1967).

JOHN D. RANDOLPH, Primary Examiner

U.S. Cl. X.R.

260—295.5 B, 326.13 A, 999